(12) United States Patent
Barten et al.

(10) Patent No.: US 12,304,771 B2
(45) Date of Patent: May 20, 2025

(54) ENERGY CHAIN AND STORAGE UNIT FOR AN ENERGY CHAIN

(71) Applicant: igus GmbH, Cologne (DE)

(72) Inventors: Dominik Barten, Meckenheim (DE); Andreas Hermey, Hennef (DE)

(73) Assignee: igus GmbH, Cologne (DE)

( * ) Notice: Subject to any disclaimer, the term of this patent is extended or adjusted under 35 U.S.C. 154(b) by 258 days.

(21) Appl. No.: 17/787,042

(22) PCT Filed: Dec. 18, 2020

(86) PCT No.: PCT/EP2020/087132
§ 371 (c)(1),
(2) Date: Jun. 17, 2022

(87) PCT Pub. No.: WO2021/123242
PCT Pub. Date: Jun. 24, 2021

(65) Prior Publication Data
US 2023/0026012 A1     Jan. 26, 2023

(30) Foreign Application Priority Data
Dec. 19, 2019   (DE) ............. 20 2019 107 117.6

(51) Int. Cl.
*B65H 75/36*      (2006.01)
*F16G 13/16*      (2006.01)
(Continued)

(52) U.S. Cl.
CPC ......... *B65H 75/362* (2013.01); *F16G 13/16* (2013.01); *F16G 13/18* (2013.01); *H02G 11/006* (2013.01);
(Continued)

(58) Field of Classification Search
CPC .......... F16G 13/12; F16G 13/16; F16G 13/18; H02G 11/006; B65H 75/362; B65H 2701/34; B65H 2701/50
(Continued)

(56) References Cited

U.S. PATENT DOCUMENTS

| 6,425,238 B1 | 7/2002 | Blase |
| 6,612,104 B2 | 9/2003 | Blase |

(Continued)

FOREIGN PATENT DOCUMENTS

| CN | 1299447 A | 6/2001 |
| CN | 1492163 A | 4/2004 |

(Continued)

OTHER PUBLICATIONS

Chinese National Intellectual Property Administration, Office Action for CN 202080088787.5, Oct. 8, 2023, pp. 1-9.

(Continued)

*Primary Examiner* — Jared O Brown
(74) *Attorney, Agent, or Firm* — Cahn & Samuels, LLP

(57) ABSTRACT

An energy chain and storage unit for an energy chain having a first chain portion and a second chain portion each including pivotable chain links with upper and lower narrow surfaces, and two side parts (6, 7). At least some of the chain links (2) of the first chain portion (3) have guide elements (12), which project outwards from the side parts (6, 7) allowing the chain links to guide on guide tracks (35), arranged on the outside of the chain links, and at least some of the chain links (4) of the second chain portion (5) have roller elements (13) or sliding elements (14), which project laterally beyond the upper or the lower narrow surfaces (8) of side parts (6, 7) of the chain links and can respectively roll or slide on a region which is located opposite said narrow surfaces (8).

23 Claims, 4 Drawing Sheets

(51) Int. Cl.
*F16G 13/18* (2006.01)
*H02G 11/00* (2006.01)
(52) U.S. Cl.
CPC .. *B65H 2701/34* (2013.01); *B65H 2701/3911* (2013.01); *B65H 2701/50* (2013.01)
(58) Field of Classification Search
USPC .................................................. 59/78.1, 900
See application file for complete search history.

(56) References Cited

U.S. PATENT DOCUMENTS

| | | | |
|---|---|---|---|
| 7,497,072 | B2 | 3/2009 | Hermey |
| 11,608,875 | B2 | 3/2023 | Theiss |
| 2002/0124548 | A1* | 9/2002 | Blase ...................... F16G 13/16 59/78.1 |
| 2013/0306780 | A1* | 11/2013 | Marcoullier ........... H02G 11/02 242/388 |
| 2015/0128556 | A1 | 5/2015 | Hermey |
| 2016/0061290 | A1 | 3/2016 | Hermey et al. |
| 2020/0130942 | A1 | 4/2020 | Tetsuka |
| 2021/0173381 | A1* | 6/2021 | Edsinger ................. F16G 13/16 |

FOREIGN PATENT DOCUMENTS

| | | | | |
|---|---|---|---|---|
| CN | 102808900 | A | | 12/2012 |
| CN | 104508324 | A | | 4/2015 |
| CN | 107005036 | A | | 8/2017 |
| CN | 110023647 | A | | 7/2019 |
| CN | 110 537 036 | A | | 12/2019 |
| DE | 1131 964 | A | | 6/1962 |
| DE | 100 53 262 | A1 | | 5/2002 |
| DE | 20 2005 005 826 | U1 | | 7/2005 |
| DE | 20 2010 005 842 | U1 | | 10/2011 |
| DE | 11 2018 002 141 | T5 | | 1/2020 |
| EP | 1 201 963 | A1 | | 5/2002 |
| EP | 2 855 973 | B1 | | 5/2016 |
| GB | 940048 | A | | 10/1963 |
| JP | S54-162895 | U | | 11/1979 |
| JP | 2005061554 | A | | 3/2005 |
| JP | 2007010087 | A | | 1/2007 |
| JP | 2009-534593 | A | | 9/2009 |
| JP | 2019533622 | A | | 11/2019 |
| WO | 2006/108401 | A1 | | 10/2006 |
| WO | WO-2010103904 | A1 | * 9/2010 | ........... H02G 11/006 |
| WO | 2011/131662 | A2 | | 10/2011 |
| WO | WO-2013150367 | A1 | * 10/2013 | ............. F16G 13/16 |
| WO | WO-2013182889 | A1 | * 12/2013 | ............. F16G 13/16 |
| WO | 2017046545 | A1 | | 3/2017 |
| WO | WO-2018072941 | A1 | * 4/2018 | ............. F16G 13/16 |

OTHER PUBLICATIONS

Japanese Patent Office, Notification of Reasons for Rejection for JP2022-536847, Oct. 31, 2023, pp. 1-5.
European Patent Office, English abstract for CN102808900A, retrieved Feb. 22, 2024.
European Patent Office, English abstract for CN104508324A, retrieved Feb. 22, 2024.
European Patent Office, English abstract for CN107005036A, retrieved Feb. 22, 2024.
European Patent Office, English abstract for CN110023647A, retrieved Feb. 22, 2024.
European Patent Office, English abstract for JP2005061554A, retrieved Feb. 22, 2024.
European Patent Office, English abstract for JP2007010087A, retrieved Feb. 22, 2024.
The International Bureau of WIPO, International Search Report for PCT App. No. PCT/EP2020/087132, May 17, 2022, pp. 1-6.
Deutches Patent- und Markenamt, search report for German App. No. 20 2019 107 117.6, Nov. 24, 2020, pp. 1-5.
European Patent Office, Written Opinion for PCT App. No. PCT/EP2020/087132, Jun. 24, 2021, pp. 1-5.
European Patent Office, International Search Report for PCT App. No. PCT/EP2020/087132, Jun. 24, 2021, pp. 1-3.
European Patent Office, English Abstract for DE10053262A1, printed on Jun. 16, 2022.
European Patent Office, English Abstract for DE202005005826U1, printed on Jun. 16, 2022.
European Patent Office, English Abstract for EP1201963A1, printed on Jun. 16, 2022.
European Patent Office, English Abstract for CN110537036A, printed on Jun. 16, 2022.

* cited by examiner

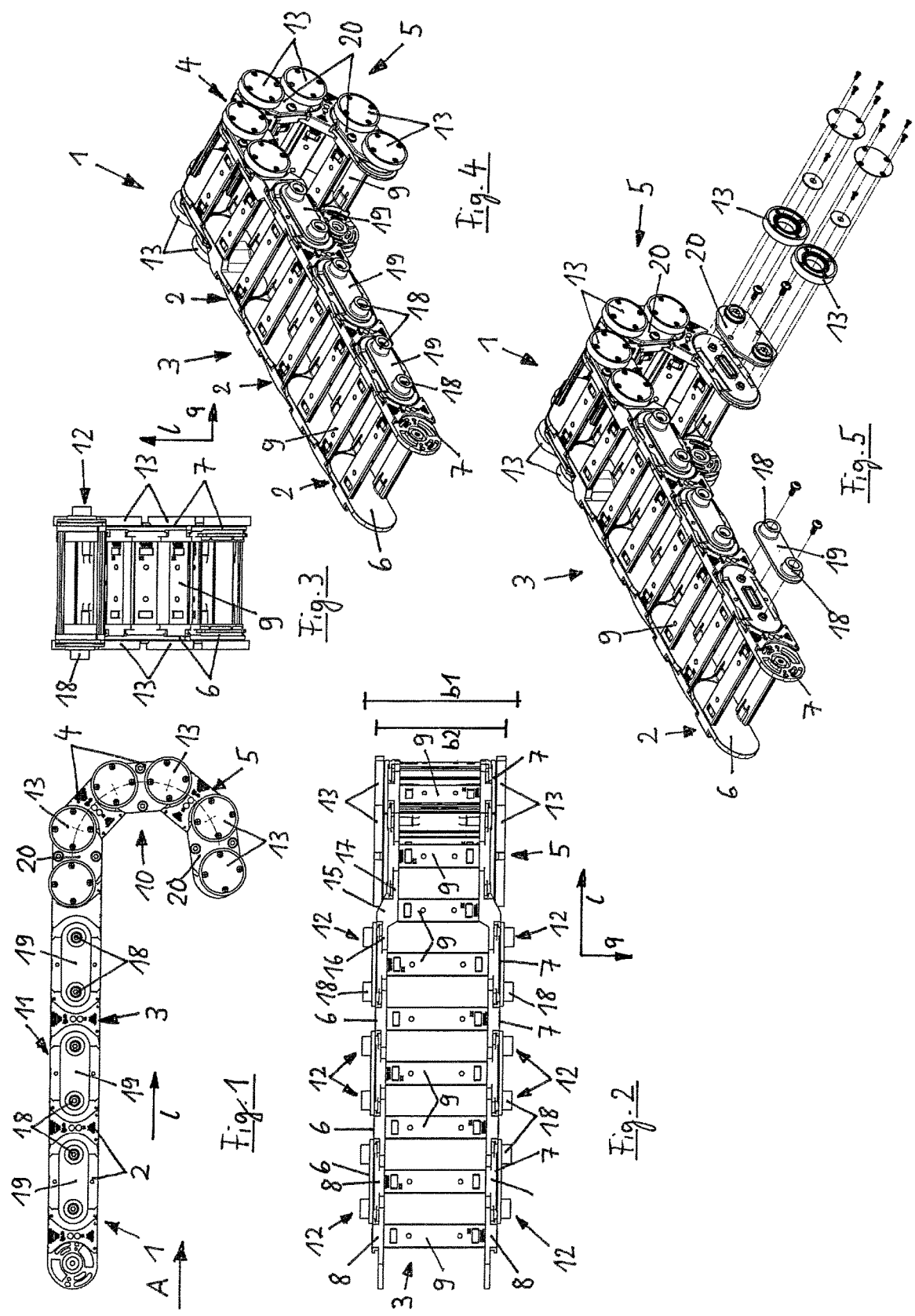

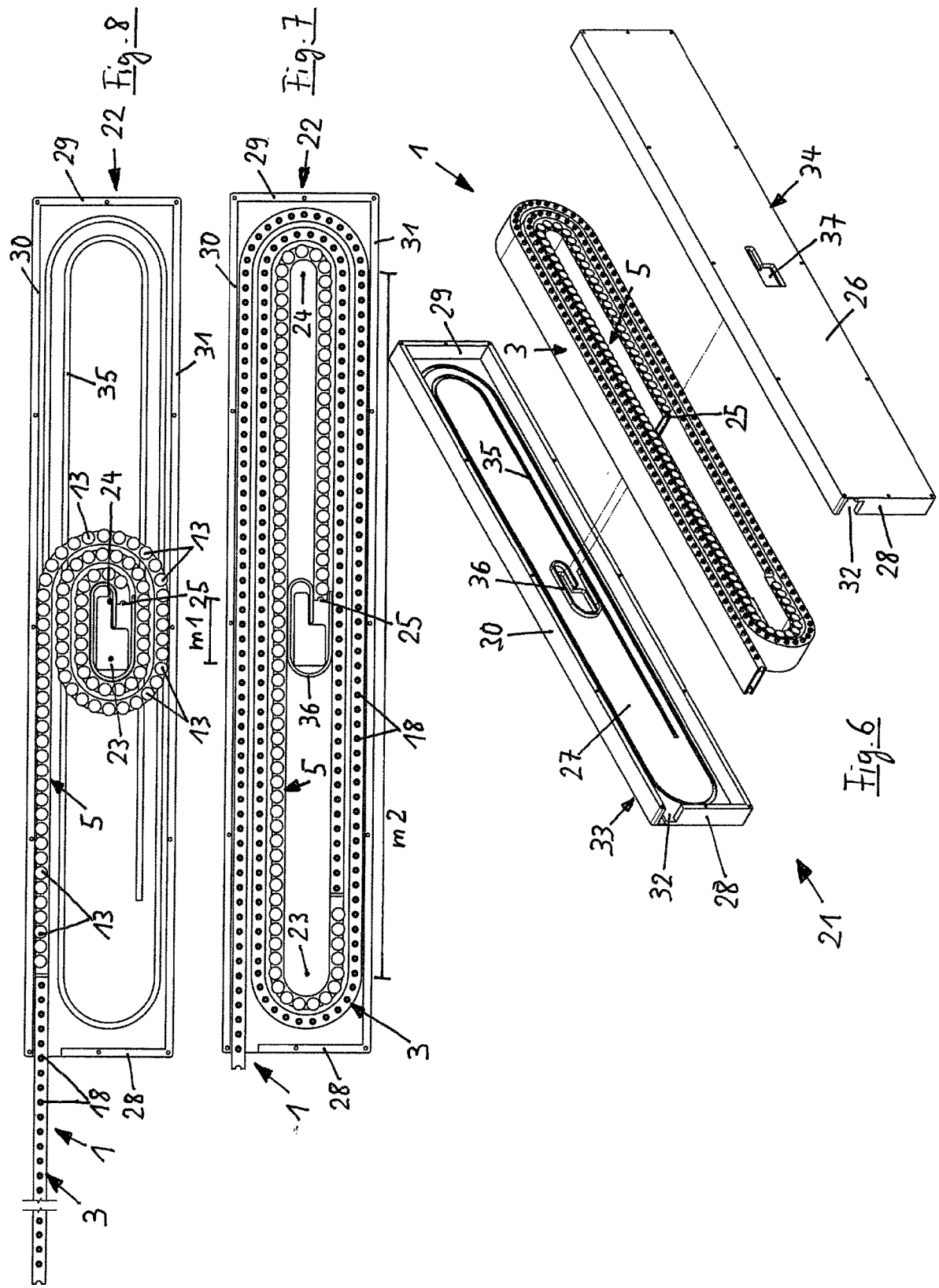

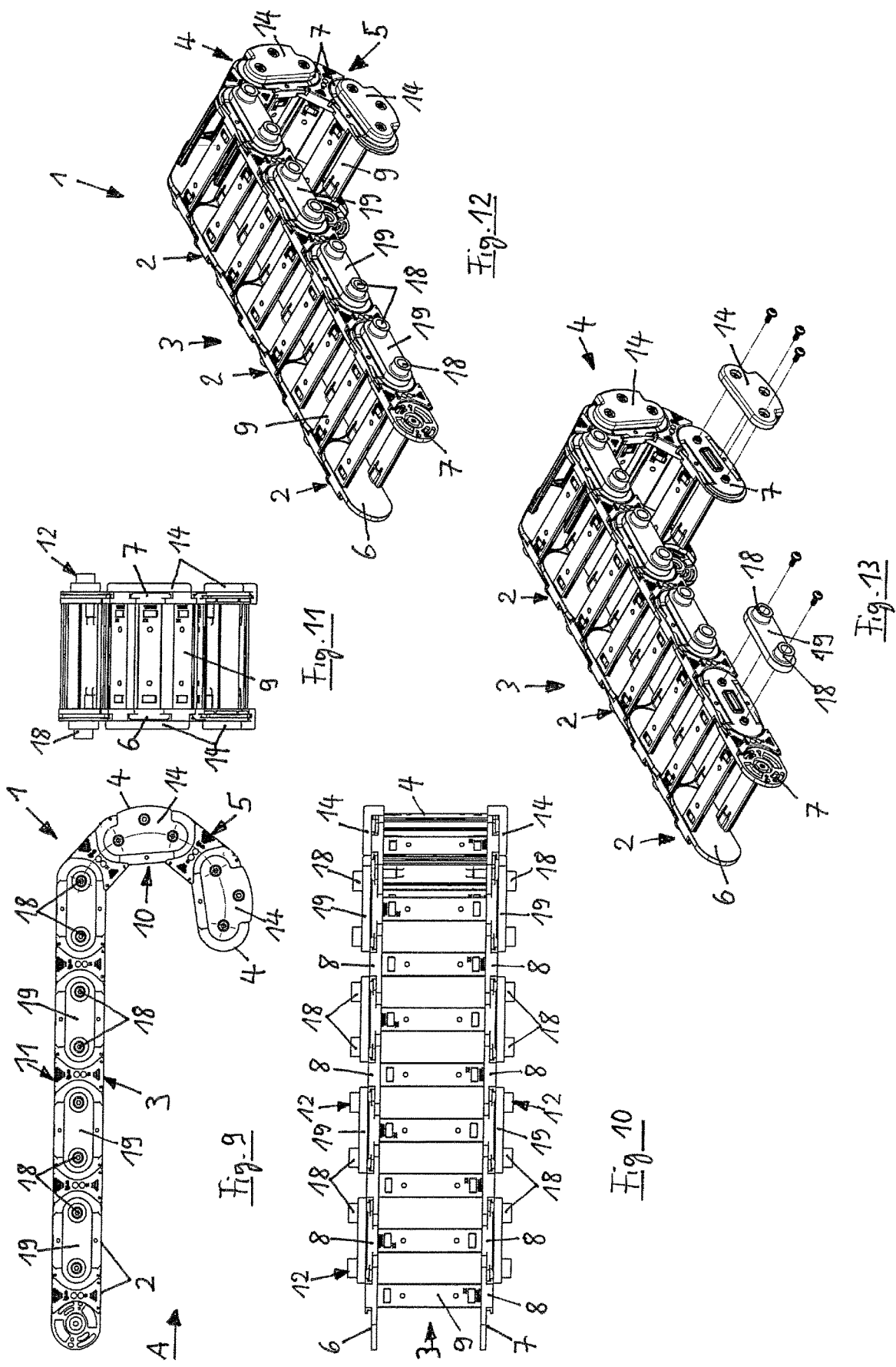

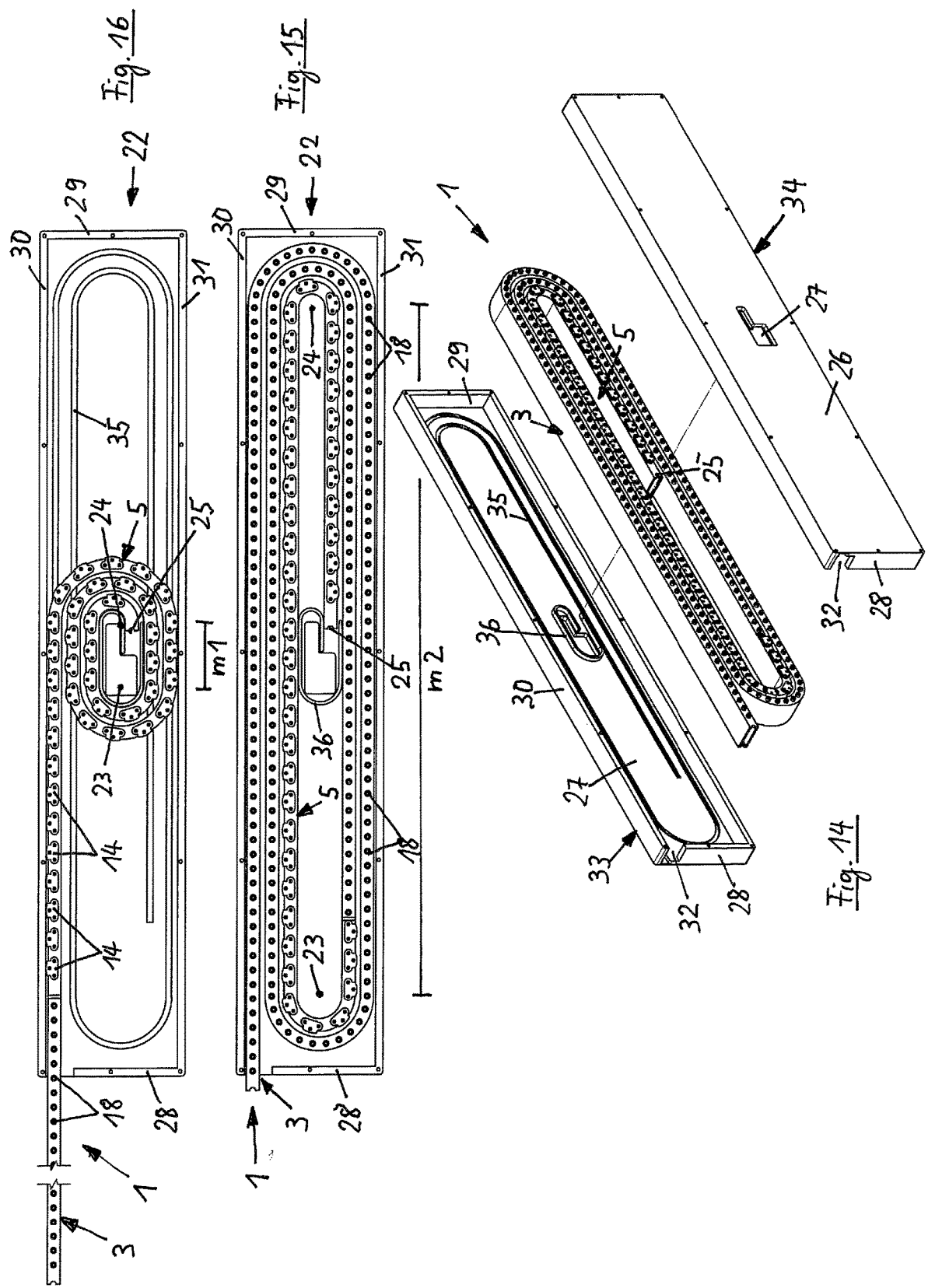

ENERGY CHAIN AND STORAGE UNIT FOR AN ENERGY CHAIN

The invention relates to an energy chain with a first chain portion having several chain links and a second chain portion having several chain links, wherein the chain links of the two chain portions are connected pivotably to one another and comprise in each case two side parts, which lie opposite one another in a transverse direction relative to the longitudinal direction of the energy chain and which have upper and lower narrow surfaces facing perpendicularly to the transverse direction and to the longitudinal direction, wherein at least some of the chain links have cross members connecting their side parts.

Energy chains of the named type can be arranged such that, because of the pivotable connection of adjacent chain links, they have one or more deflection regions by which strands of the energy chain are connected to one another. When the energy chain is moved, the strands and/or deflection regions of the energy chain can be guided along external guide tracks.

On the other hand, in particular in the case of energy chains which are longer or which run on one another, regions of the strands and/or deflection regions contact one another and there is the need to guide these regions against one another as frictionlessly as possible. This also relates to a guiding which is as frictionless as possible on external contact surfaces lying opposite the narrow surfaces of the side plates.

There is therefore the desire for a guiding of the energy chain that is as frictionless as possible in two respects, on the one hand in relation to a guiding along external guide tracks and on the other hand in relation to a guiding of regions, contacting one another, of one or more energy chains against one another as well as against external contact surfaces lying opposite the narrow surfaces of the side parts.

The object of the present invention is to provide an energy chain which makes it possible to guide the latter both along guide tracks which can be arranged externally and along regions contacting one another or external contact surfaces with friction forces which are as small as possible.

The object is achieved according to the invention in that at least some of the chain links of the first chain portion have guide elements, which project outwards from their side parts in the transverse direction, for guiding the chain links against or on guide tracks which can be arranged outside their side parts, and at least some of the chain links of the second chain portion have roller elements or sliding elements, which project over the upper or the lower narrow surfaces of their side parts and can roll or slide on a region which lies opposite these narrow surfaces and contacts the energy chain.

The two chain portions can adjoin one another in an articulated manner.

The energy chain according to the invention can consist exclusively of the first and the second chain portion.

On the other hand, the energy chain according to the invention can have several alternating first and second chain portions.

The overall width of the chain links of the second chain portion in the transverse direction can be smaller than or equal to the overall width of the chain links of the first chain portion minus the width in the transverse direction of the guide elements extending on the outside.

The roller elements or sliding elements of the second chain portion can be arranged in the longitudinal direction flush with the narrow surfaces of the side parts of the chain links of the first chain portion, with the result that the roller or sliding elements of a region of the second chain portion can roll or slide on the narrow surfaces of the side parts of a region of the first chain portion.

In the event that, when the energy chain is moved, the second chain portion enters a region in which guide tracks are arranged for the external guiding of the first chain portion, the second chain portion is not obstructed in this region by the guide tracks. The second chain portion can be moved past the guide tracks because of its correspondingly smaller width.

According to a preferred embodiment, a chain link, the side parts of which have an outwardly offset region and an inwardly offset region, is arranged between the two chain portions, wherein the outwardly offset region is connected in an articulated manner to the adjacent side part of the first chain portion in the longitudinal direction and the inwardly offset region is connected in an articulated manner to the adjacent side part of the second chain portion in the longitudinal direction.

Furthermore, it is provided according to a preferred embodiment that the adjacent, in the longitudinal direction, side parts of the chain links of the first chain portion and/or of the second chain portion are formed alternately of inner and outer plates. The inner and outer plates have overlapping regions, wherein the overlapping regions of the outer plates are arranged outside the overlapping regions of the inner plates.

In a preferred embodiment, the guide elements of the chain links of the first chain portion are formed as guide rollers.

In particular, two guide rollers in each case can be arranged on the outside of the outer plates of the chain links of the first chain portion.

Two roller elements in each case can accordingly be arranged on the outside of the outer plates of the chain links of the second chain portion.

Adjacent chain links of the energy chain can be capable of being angled in one pivoting direction to a limited degree relative to one another due to limit stops, whereby a minimum radius for the deflection arcs of the deflection regions of the energy chain is defined. Furthermore, they can be capable of being angled in the other pivoting direction to a limited degree up to their orientation stretched out relative to one another. Since adjacent chain links in this case are not pivotable beyond their orientation stretched out relative to one another, in the case of substantially self-supporting strands in particular a relatively stable straight extension thereof is made possible.

The invention furthermore relates to a storage unit for an energy chain. The storage unit comprises a storage housing and, arranged therein, an energy chain according to the present invention with the features described above.

The energy chain has a first chain portion of the type described above and, adjoining it, a second chain portion of the type described above and is spirally wound in the storage housing spirally with two winding axes which are variable in terms of their spacing. It has a fixed connection point arranged stationarily in the storage housing in the interior of the spiral winding at one of its ends and a movable connection point at its other end, wherein, by movement of the movable connection point and movement caused thereby of the energy chain, the spacing of the winding axes from one another is variable between a minimum spacing and a maximum spacing. The first chain portion is connected to the movable connection point and the second chain portion is connected to the fixed connection point.

The fixed connection point is preferably arranged in the central region of the storage housing relative to its longitudinal extension in the longitudinal direction of the strands.

A storage unit of the type named above is suitable in particular for storage of an energy chain in an available storage space with a relatively long extension, with the result that the maximum spacing of the two winding axes can be chosen to be relatively large in relation to their minimum spacing.

The storage housing has two parallel side plates, which are arranged parallel to the deflection arcs of the deflection regions of the energy chain and which extend in the longitudinal direction of the strands over the deflection regions of the energy chain on both winding axes. The movable connection point is arranged outside the storage housing.

A feed-through opening for the strand, connected to the movable connection point, of the first chain portion of the energy chain can be provided between the side plates in their upper or lower regions.

On their inner faces the side plates of the storage housing have guide tracks lying opposite one another, which interact with the guide elements projecting outwards on the chain links of the first chain portion. The guide tracks extend spirally in one or more windings on the inner faces of the side plates about two winding axes, which correspond to the winding axes of the energy chain arranged at their maximum spacing. The length of the guide tracks wound about their stationary winding axes is adapted to the length of the first chain portion of the energy chain. The first chain portion of the energy chain can extend over the entire length of the guide tracks in its state retracted into the storage housing. The adjoining second chain portion of the energy chain then extends, with at least one deflection region, about at least one of the winding axes arranged at their maximum spacing, towards the fixed connection point and, with its side facing radially outwards in relation to the deflection region, rests against the first chain portion via the roller elements or sliding elements.

If the energy chain, with its first chain portion, is pulled out of the storage housing through the feed-through opening, the region of the first chain portion stored spirally in the storage housing along the guide tracks unwinds. In this case the chain links of the second chain portion adjoining the first chain portion are spirally wound up without obstruction by the guide tracks, wherein the spacing between their winding axes is reduced up to their minimum spacing in the region of the fixed connection point.

In order to limit the inner radius of the spiral winding of the second chain portion about the winding axes arranged at their minimum spacing, an element supporting the inner winding can be provided.

The guide tracks arranged on the inside of the side plates of the storage housing can be formed as guide rails on which the guide elements projecting outwards on the chain links of the first chain portion slide or roll.

The roller elements or sliding elements of the chain links of the second chain portion project on the narrow surfaces, lying radially outwards in relation to the deflection regions, of the side parts of the chain links and thus roll or slide on the radially inwardly facing sides of the chain links contacting them.

Because of the guiding according to the invention of the chain links on the guide tracks of the side walls of the storage housing with the aid of the laterally projecting guide elements and on regions, resting against one another, of the energy chain, friction effects are reduced to a minimum during movement of the energy chain inside the storage housing. The energy chain can therefore be pulled out of the storage housing with relatively little tensile force on the strand connected to the movable connection point and inserted in the storage housing with relatively little compressive force on the strand connected to the movable connection point in its longitudinal direction. The tensile and compressive force can, where appropriate, be exerted manually on the strand connected to the movable connection point and extending out of the storage housing.

Adjoining the region of the fixed connection point, an opening can be provided, at least in one side plate of the storage housing, for feeding the cables emerging from the energy chain in the case of the fixed connection point through.

At the face-side ends of the side plates the storage housing can have face plates and upper and lower closing plates connecting these to one another.

The upper and lower closing plates can be arranged such that they guide the upper or lower strand of the energy chain arranged in the storage housing in a sliding manner.

The storage housing can be formed of two housing shells, the separation face of which lies in a plane which extends parallel to the deflection arcs of the deflection regions of the energy chain.

One of the face plates can have the feed-through opening in the upper or lower region for the strand of the energy chain connected to the movable connection.

Embodiment examples of the energy chain and storage unit according to the invention are described in more detail below with reference to the drawing.

IN THE DRAWING THERE ARE SHOWN IN

FIG. 1 a side view of a portion of a first embodiment example of an energy chain, FIG. 2 a plan view of the portion of the energy chain represented in FIG. 1, FIG. 3 a face-side view of the portion of the energy chain represented in FIG. 1 in the direction of the arrow A, FIG. 4 a perspective representation of the portion of the energy chain represented in FIG. 1, FIG. 5 the perspective view according to FIG. 4 with an exploded representation of the guide elements attached to the side parts of the first portion and of the roller elements arranged rotatably on the side plates of the second portion, FIG. 6 a perspective exploded representation of a storage unit for the energy chain, FIG. 7 a side view of the energy chain arranged in the storage housing in its maximally retracted state, FIG. 8 a side view of the energy chain arranged in the storage housing in its maximally pulled-out state, FIG. 9 a side view of a portion of a second embodiment example of an energy chain, FIG. 10 a plan view of the portion of the energy chain represented in FIG. 9, FIG. 11 a face-side view of the portion represented in FIG. 9 in the direction of the arrow A, FIG. 12 a perspective view of the portion represented in FIG. 9, FIG. 13 the perspective view according to FIG. 12 with an exploded representation of the guide elements attached to the side parts of the first portion and of the sliding elements attached to the side parts of the second portion, FIG. 14 a perspective exploded representation of a storage unit for the energy chain, FIG. 15 a side view of the energy chain arranged in the storage housing in its maximally retracted state and FIG. 16 a side view of the energy chain arranged in the storage housing in its maximally extended state.

As follows from FIGS. 1-5 and 9-13, the energy chain 1 respectively shown therein in portions includes a first chain portion 3 having several chain links 2 and a second chain portion 5 having several chain links 4. The chain links 2, 4 of the two chain portions 3, 5 are pivotably connected to one another. They have in each case two side parts 6, 7, which lie opposite one another in a transverse direction q relative to the longitudinal direction I of the energy chain 1 and which are provided with upper and lower narrow surfaces 8 facing perpendicularly to the transverse direction q and the longitudinal direction I. At least some of the chain links 2, 4 have cross members 9 connecting their side parts 6, 7.

The portion of the respective energy chain shown in the named figures is arranged with a deflection region 10, which the portion of a strand 11 adjoins.

The chain links 2 of the first chain portion 3 have guide elements 12, which project outwards from their side parts 6, 7 in the transverse direction q and which serve to guide the chain links 2 against or on guide tracks (not represented in FIGS. 1-5 and 9-13) which can be arranged outside their side parts 6, 7. The chain links 4 of the second chain portion 5, on the other hand, have roller elements (FIGS. 1-5) or sliding elements (FIGS. 9-13), which project over the upper narrow surfaces 8, according to the drawing figures, of their side parts 6, 7 and which can roll or slide on a region (not represented in the named figures) which lies opposite these narrow surfaces 8 and contacts the energy chain 1.

The overall width b2 of the chain links 4 of the second chain portion 5 in the transverse direction, including the roller elements 13 or sliding elements 14, is equal to the overall width b1 of the chain links 2 of the first chain portion 3 minus the guide elements 12 extending on the outside, i.e. the width of the region of the guide elements 12 which interacts with the guide tracks.

As furthermore follows from FIGS. 2 and 10 in particular, the roller elements 13 or sliding elements 14 of the second chain portion 5 are arranged in the longitudinal direction flush with the narrow surfaces 8 of the side parts 6, 7 of the chain links 2 of the first chain portion 3, with the result that the roller elements 13 or sliding elements 14 of a region of the second chain portion 5 can roll or slide on the narrow surfaces 8 of the side parts 6, 7 of a region of the first chain portion 3. As a result, in a region in which guide tracks are arranged for the external guiding of the first chain portion 3, the second chain portion 5 is not obstructed by the guide tracks. Because of its correspondingly smaller overall width b2 it can be moved past the guide tracks.

As shown in particular in FIGS. 2 and 10, the adjacent, in the longitudinal direction, side parts 6, 7 of the two chain portions 3 and 5 consist alternately of inner and outer plates. The inner and outer plates have overlapping regions, wherein the overlapping regions of the outer plates are arranged outside the overlapping regions of the inner plates.

As follows in particular from FIG. 2, an intermediate chain link 15, the side parts 6, 7 of which have an outwardly offset region 16 and an inwardly offset region 17, is arranged between the two chain portions 3 and 5. The outwardly offset region 16 is connected in an articulated manner to the adjacent, in the longitudinal direction, side part 6, 7 of the first chain portion 3 and the inwardly offset region 17 is connected in an articulated manner to the adjacent, in the longitudinal direction, side part 6, 7 of the second chain portion 5.

In the embodiment examples represented in the drawing, the guide elements 12 of the chain links 2 of the first chain portion 3 are formed as guide rollers 18. Two guide rollers 18 in each case are connected via a plate-shaped part 19, on which they are mounted in an articulated manner, to the outer plates of the chain links 2.

The plate-shaped parts 19 of the two embodiment examples differ only in their thickness, which is adapted in each case to the overall width b2 of the second chain portion 5.

In the embodiment example represented in FIGS. 1-5, two roller elements 13 in each case are connected externally via a correspondingly designed plate-shaped part 20, on which they are rotatably mounted, to the outer plates of the chain links 4 of the second chain portion 5.

Alternatively, according to the second embodiment example represented in the drawing, sliding elements 14 are attached externally to the outer plates of the chain links 4 of the second chain portion.

Adjacent chain links 2, 4, 15 of the energy chain 1 are capable of being angled in one pivoting direction, which is identified by the deflection region 10 depicted in FIGS. 1 and 9, to a limited degree relative to one another due to limit stops. The limit stops define a minimum radius for the deflection arc of the deflection region 10. The chain links 2, 4, 15 are capable of being angled in the opposite pivoting direction to the pivoting direction according to FIGS. 1 and 9 to a limited degree up to their orientation, stretched out relative to one another, of the strand 11 shown in FIGS. 1 and 9. Since the chain links 2, 4, 15 in this case are not pivotable beyond their orientation stretched out relative to one another, in the case of a substantially self-supporting strand in particular a relatively stable straight extension thereof is made possible, as shown in FIGS. 1 and 9.

In each case a storage unit 21 for the energy chain 1 shown in portions in FIGS. 1-5 and 9-13 is represented in FIGS. 6-8 and 14-16.

As follows from the figures, the energy chain 1 is spirally wound in a storage housing 22 with two winding axes 23, 24 which are variable in terms of their spacing. It has a fixed connection point 25 arranged stationarily in the storage housing 22 in the interior of the spiral winding at one of its ends and a movable connection point (not shown in the drawing) at its other end, with the result that, by movement of the movable connection point and by movement caused thereby of the energy chain 1, the spacing of the winding axes 23, 24 from one another is variable between a minimum spacing m1 and a maximum spacing m2. The first chain portion 3 is connected to the movable connection point and the second chain portion 5 is connected to the fixed connection point 25. The fixed connection point 25 is arranged in the central region of the storage housing relative to its extension in the longitudinal direction I of the strands 11.

The storage housing 22 has two parallel side plates 26, 27, which are arranged parallel to the deflection arcs of the deflection regions 10 of the energy chain 1 and extend in the longitudinal direction of the strands 11 over the deflection regions 10 of the energy chain 1 on both winding axes 23, 24. At the face-side ends of the side plates 26, 27 the storage housing 22 has face plates 28, 29 and upper and lower closing plates 30, 31 connecting these to one another. The face plate 28 facing in the direction of the movable connection point located outside the storage housing 22 has a feed-through opening 32 in its upper region for the strand, connected to the movable connection point, of the first chain portion 3 of the energy chain 1. The storage housing 22 is formed of two housing shells 33, 34, which can be attached to one another and which receive the region of the energy chain 1 arranged in the storage housing 22.

On their inner faces the side plates 26, 27 of the storage housing 22 have guide tracks 35, which lie opposite one another and which interact with the guide elements 12 projecting outwards on the chain links 2 of the first chain portion 3. The guide tracks 35 extend spirally in two windings on the inner faces of the side plates 26, 27 about two winding axes, which correspond to the winding axes 23, 24 of the energy chain 1 arranged at their maximum spacing m2. The length of the guide tracks wound about their two stationary winding axes is adapted to the length of the first chain portion 3 of the energy chain 1 maximally retracted into the storage unit 21. As follows from FIGS. 7 and 15, in the maximally retracted position, the second chain portion 5 adjoining the first chain portion 3 extends, in the two embodiment examples represented in the drawing, with one deflection region 10 in each case, about the winding axes 23, 24 arranged at their maximum spacing m2, towards the fixed connection point 25 and, with its side facing radially outwards in relation to the deflection regions 10, rests against the first chain portion 3 via the roller elements 13 of the first embodiment example or the sliding elements 14 of the second embodiment example.

If the energy chain 1, with its first chain portion 3, is pulled out of the storage housing 22, the region of the first chain portion 3 stored spirally in the storage housing 22 along the guide tracks unwinds. In this case the chain links 4 of the second chain portion 5 adjoining the first chain portion 3 are spirally wound up without obstruction by the guide tracks 35, wherein the spacing between their winding axes 23, 24 is reduced up to their minimum spacing m1, represented in FIGS. 8 and 16, in the region of the fixed connection point 25.

To limit the inner radius of the spiral winding of the second chain portion 5 about the winding axes 23, 24 arranged at their minimum spacing m1, an element 36 supporting the inner winding is provided in the form of a protrusion extending about a spiral winding.

The guide tracks 35 arranged internally on the side plates 26, 27 of the storage housing 22 are formed as guide rails on which the guide rollers 18 of the two embodiment examples, projecting outwards on the chain links 2 of the first chain portion 3, roll.

The roller elements 13 according to the first embodiment example and the sliding elements 14 according to the second embodiment example of the chain links 4 of the second chain portion project on the narrow surfaces 8, lying radially outwards in relation to the deflection regions 10, of the side parts 6, 7 of the chain links 4 and thus roll or slide on the radially inwardly facing sides of the chain links, contacting them, of the portion of the energy chain 1 arranged in the storage housing 22.

Adjoining the region of the fixed connection point 25, an opening 37 is provided in both side plates 26, 27 of the storage housing 22 for feeding the cables (not shown in the drawing) emerging from the energy chain 1 in the case of the fixed connection point 25 through.

LIST OF REFERENCE NUMBERS

1 Energy chain
2 Chain link
3 First chain portion
4 Chain link
5 Second chain portion
6 Side part
7 Side part
8 Narrow surface
9 Cross member
10 Deflection region
11 Strand
12 Guide element
13 Roller element
14 Sliding element
15 Chain link
16 Outwardly offset region
17 Inwardly offset region
18 Guide roller
19 Plate-shaped part
20 Plate-shaped part
21 Storage unit
22 Storage housing
23 Winding axis
24 Winding axis
25 Fixed connection point
26 Side plate
27 Side plate
28 Face plate
29 Face plate
30 Closing plate
31 Closing plate
32 Feed-through opening
33 Housing shell
34 Housing shell
35 Guide track
36 Supporting element
37 Opening
q Transverse direction
l Longitudinal direction
b1 Overall width
b2 Overall width
m1 Minimum spacing
m2 Maximum spacing

The invention claimed is:

1. An energy chain (1) comprising a first chain portion (3) having a plurality of first chain links (2) and a second chain portion (5) having a plurality of second chain links (4), each of the second chain links including a different characteristic than each of the first chain links, wherein each of the first and second chain links (2, 4) of the first and second chain portions (3, 5) are pivotably connected to one another and each comprise two side parts (6, 7), which lie opposite one another in a transverse direction (q) relative to a longitudinal direction (l) of the energy chain (1) and which have upper and lower narrow surfaces (8) facing perpendicularly to the transverse direction (q) and to the longitudinal direction (l), wherein at least some of the first and second chain links (2, 4) have cross members (9) connecting the side parts (6, 7) of the first and second chain links, wherein at least some of the first chain links (2) of the first chain portion (3) have guide elements (12), which project outwards from the side parts (6, 7) in the transverse direction (q), for guiding the first chain links (2) against or on guide tracks (35) which can be arranged outside their side parts (6, 7), and at least some of the second chain links (4) of the second chain portion (5) have roller elements (13) or sliding elements (14), which project laterally beyond and over the upper or lower narrow surfaces (8) of the side parts (6, 7) and can roll or slide on a region which lies opposite the upper and lower narrow surfaces (8) and contacts the energy chain (1), and wherein an overall width (b2) of the second chain links (4) of the second chain portion (5) in the transverse direction (q) is smaller than or equal to an overall width (b1)

of the first chain links (2) of the first chain portion (3) minus a width in the transverse direction (q) of the guide elements (12).

2. The energy chain (1) according to claim 1, wherein the first and second chain portions adjoin one another in an articulated manner.

3. The energy chain (1) according to claim 1, wherein the first chain portion (3) is the only first chain portion and the second chain portion (5) is the only second chain portion.

4. The energy chain (1) according to claim 1, further comprising a plurality of alternating first and second chain portions (3, 5).

5. The energy chain (1) according to claim 1, wherein the roller elements (13) or the sliding elements (14) of the second chain portion (5) are arranged in the longitudinal direction flush with the upper and lower narrow surfaces (8) of the side parts (6, 7) of the first chain links (2) of the first chain portion (3), wherein the roller elements (13) or the sliding elements (14) of a region of the second chain portion (5) can roll or slide on the upper and lower narrow surfaces (8) of the side parts (6, 7) of a region of the first chain portion (3).

6. The energy chain (1) according to claim 1, wherein adjacent ones of the side parts in the longitudinal direction (l) of the first and second chain links (2, 4) of the first chain portion (3) and/or of the second chain portion (5) are formed alternately of inner and outer plates.

7. The energy chain (1) according to claim 6, wherein each of the guide elements (12) of the first chain links (2) of the first chain portion (3) are formed as guide rollers (18).

8. The energy chain (1) according to claim 7, wherein the guide rollers (18) of each of the first chain links are two guide rollers (18) arranged on an outside of the outer plates of the first chain links (2) of the first chain portion (3).

9. The energy chain (1) according to claim 6, wherein the roller elements are two roller elements (13) arranged on an outside of the outer plates of the second chain links (4) of the second chain portion (5).

10. The energy chain (1) according to claim 1, wherein adjacent ones of the first and/or second chain links (2, 4) of the energy chain (1) are capable of being angled in one pivoting direction to a limited degree relative to one another due to limit stops, while the adjacent ones of the first and/or second chain links (2, 4) are capable of being angled in another pivoting direction to a limited degree up to orientation in which the adjacent ones of the first and/or second chain links are stretched out relative to one another.

11. The energy chain (1) according to claim 1, wherein the first chain portion (3) is connected to the second chain portion (5).

12. A storage unit (21) comprising: a storage housing (22) and the energy chain (1) according to claim 1 partially or entirely arranged within the storage housing,
wherein the energy chain (1) has only one first chain portion (3) and the second chain portion (5) adjoins the first chain portion, the second chain portion is spirally wound in the storage housing (22) with two winding axes (23, 24) which are variable in terms of a spacing between the two winding axes (23, 24) and the second chain portion has a fixed connection point (25) arranged stationarily in the storage housing (22) in an interior of the spiral winding at one end and a movable connection point at another end, wherein, by movement of the movable connection point and movement caused thereby of the energy chain (1), the spacing of the winding axes (23, 24) from one another is variable between a minimum spacing (m1) and a maximum spacing (m2), wherein the first chain portion (3) is connected to the movable connection point and the second chain portion (5) is connected to the fixed connection point (25), wherein the roller elements (13) or the sliding elements (14) of the second chain links (4) of the second chain portion (5) project on the upper and lower narrow surfaces (8), lying radially outwards in relation to deflection regions (10), of the side parts (6, 7) of the second chain links (4) and can roll or slide on radially inwardly facing sides of the first and second chain links contacting the inwardly facing sides,
wherein the storage housing (22) has guide tracks (35), which lie opposite one another and interact with the guide elements (12) projecting outwards on the first chain links (2) of the first chain portion (3) and extend spirally in one or more windings about two winding axes, which correspond to the winding axes (23, 24) of the energy chain (1) arranged at the maximum spacing (m2).

13. The storage unit (21) according to claim 12, wherein the first chain portion (3) of the energy chain (1) extends over an entire length of the guide tracks (35) when maximally retracted into the storage housing (22).

14. The storage unit (21) according to claim 12, wherein the guide tracks (35) are formed as guide rails on which the guide elements (12) projecting outwards on the first chain links (2) of the first chain portion (3) can roll or slide.

15. The storage unit (21) according to claim 12, further comprising an element (36) which limits the inner radius of the spiral winding of the second chain portion (5) about the winding axes (23, 24) arranged at the minimum spacing (m1) and supports the spiral winding.

16. The storage unit (21) according to claim 12, wherein the storage housing (22) includes two parallel side plates (26, 27) arranged parallel to the longitudinal direction (l) of the energy chain (1), wherein the guide tracks (35) of the storage housing (22) are arranged on inner faces of the side plates (26, 27).

17. The storage unit (21) according to claim 16, wherein, adjoining a region of the fixed connection point (25), an opening (37) passing through at least one of the parallel side plates (26, 27) of the storage housing (22), the opening configured to feed cables emerging from the energy chain (1).

18. The storage unit (21) according to claim 16, wherein at face-side ends of the parallel side plates (26, 27), the storage housing (22) includes face plates (28) and upper and lower closing plates (30, 31) connecting the parallel side plates to one another.

19. The storage unit (21) according to claim 18, wherein the upper and lower closing plates (30, 31) of the storage housing (22) are arranged such that the storage housing (22) guides upper or lower strands (11) of the energy chain (1) arranged in the storage housing (22) in a sliding manner.

20. The storage unit (21) according to claim 18, wherein one of the face plates (28, 29) includes a feed-through opening (32) in an upper or lower region for a strand of the energy chain (1) connected to the movable connection point.

21. The storage unit (21) according to claim 12, wherein the storage housing (22) includes two housing shells (33, 34), a separation face of the housing shells extends parallel to the deflection arcs of the deflection regions (10) of the energy chain (1).

22. An energy chain (1) comprising:
a first chain portion (3) having a plurality of first chain links (2);

a second chain portion (5) having a plurality of second chain links (4), each of the second chain links including a different characteristic than each of the first chain links; and a third chain link (15) having two side parts (6, 7) including an outwardly offset region (16) and an inwardly offset region (17), and the third chain link (15) is arranged between the first and second chain portions (3, 5), wherein each of the first and second chain links (2, 4) of the two first and second chain portions (3, 5) are pivotably connected to one another and each includes two side parts (6, 7), which lie opposite one another in a transverse direction (q) relative to a longitudinal direction (l) of the energy chain (1) and which have upper and lower narrow surfaces (8) facing perpendicularly to the transverse direction (q) and to the longitudinal direction (l), wherein at least some of the first and second chain links (2, 4) have cross members (9) connecting the side parts (6, 7), wherein at least some of the first chain links (2) of the first chain portion (3) have guide elements (12), which project outwards from the side parts (6, 7) in the transverse direction (q), for guiding the first chain links (2) against or on guide tracks (35) which can be arranged outside the side parts (6, 7), and at least some of the second chain links (4) of the second chain portion (5) have roller elements (13) or sliding elements (14), which project over the upper or lower narrow surfaces (8) of the side parts (6, 7) and can roll or slide on a region which lies opposite the upper and lower narrow surfaces (8) and contacts the energy chain (1), and wherein the outwardly offset region (16) is connected in an articulated manner to an adjacent one of the side parts in the longitudinal direction (l) of the first chain portion (3) and the inwardly offset region (17) is connected in an articulated manner to another adjacent one of the side parts in the longitudinal direction (l) of the second chain portion (5).

23. The energy chain (1) according to claim 22, wherein the roller elements (13) or sliding elements (14) extend laterally beyond the upper or lower narrow surfaces (8) of the side parts (6, 7).

* * * * *